C. MEYER.
Making Rubber Fabrics.
No. 31,729.
Patented March 19, 1861.
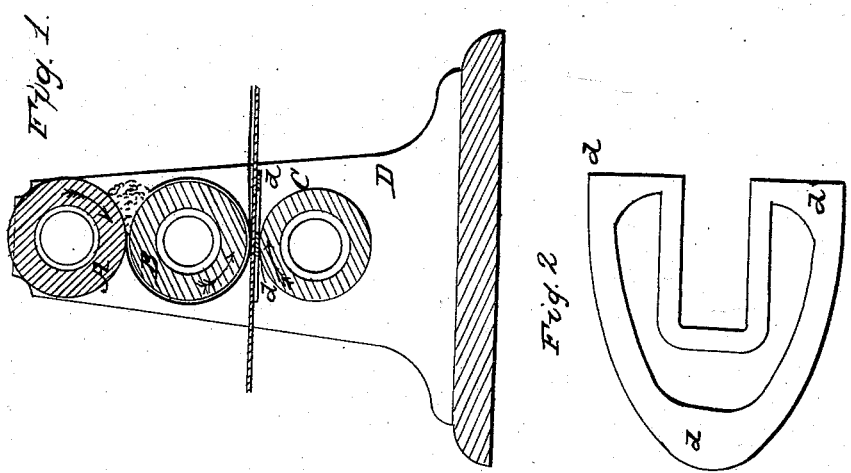

UNITED STATES PATENT OFFICE.

CHRISTOPHER MEYER, OF NEW BRUNSWICK, NEW JERSEY.

METHOD OF APPLYING CAOUTCHOUC TO CLOTH, &c.

Specification of Letters Patent No. 31,729, dated March 19, 1861.

*To all whom it may concern:*

Be it known that I, CHRISTOPHER MEYER, of New Brunswick, in the county of Middlesex and State of New Jersey, have invented a new and improved mode of applying india-rubber and gutta-percha to cloth, leather, or other fabrics or materials on such parts of the surface thereof or in such forms or figures as may be desired without covering the whole surface; and I do hereby declare that the following is a full, clear, and exact description of the same, reference being had to the accompanying drawings, forming part of this specification.

In the manufacture of these goods composed of cloth or other fabric coated with india rubber or gutta percha, for which the fabric requires to be cut into shaped pieces, much waste of india rubber or gutta percha is produced by coating the whole surface of a piece of fabric.

The object of my invention is to apply the india-rubber or gutta percha only to those parts of the fabric which are to be cut out for use and thus prevent such waste, also to apply india rubber or gutta percha when desired only to certain parts of the pieces which are to be cut out, or to such parts of any piece of fabric as may be desired, and to these ends my invention consists in subjecting the fabric or material to which the india-rubber or gutta-percha, is to be applied together with a sheet of india rubber or gutta percha in a plastic state, to pressure against a pattern or patterns, of the form or forms, in which it is desired to deposit the india rubber or gutta percha on the fabric or material, by which means the adhesion of india rubber or gutta percha, is caused to take place on those parts of the fabric or material which are opposite to the pattern or patterns and no other parts.

This invention may be performed by machinery or mechanical appliances of various kinds.

In the accompanying drawings I have represented a contrivance which I consider well adapted to the purpose and which I have used successfully.

Figure 1 is a vertical section of a machine consisting of three plain rollers. Fig. 2 represents the form of some of the patterns employed in the machine.

The three rollers are arranged parallel with each other and geared so as to move in the direction represented by the arrows in the drawings. They are all of the same diameters and made hollow so as to be heated by steam or otherwise. The distance between A and B is made equal to the desired thickness of the sheet of rubber that is to be applied to the cloth. B and C are placed sufficiently apart to permit the passage of the cloth, the sheet of rubber, and the pattern as shown in Fig. 1, and at the same time so close together as to compress the cloth and the rubber sufficiently at those points where the pattern is interposed to cause them to adhere together.

The rubber in a plastic state is fed in between the rollers A and B as shown in Fig. 1. The roller B being kept a little hotter than A the sheet of rubber will adhere to the former and is carried between the rollers B and C when it is made to adhere to the cloth directly over the solid portions of the pattern but nowhere else. At all other points it continues to adhere to the roller B and being carried around is renewed in its integrity of surface as it passes again between A and B.

The patterns are received by a boy as they pass from between the rollers and are handed back to another boy who places them again in their proper position and thus the process is kept up continuously.

The patterns may be permanently attached to the lower roller and thus the trouble of passing them back by hand be avoided but I prefer the course above described. This I do not claim in my present application.

What I claim as my invention and desire to secure by Letters Patent is—

Causing cloth or other fibrous material and india rubber or gutta percha to adhere in any desirable forms by means of plain pressure rollers and loose patterns substantially in the manner above set forth.

CHRISTOPHER MEYER.

Witnesses:
WM. TUSCH,
R. S. SPENCER.